United States Patent
Lachapelle

(10) Patent No.: US 6,425,213 B1
(45) Date of Patent: Jul. 30, 2002

(54) WATER IMPERMEABLE ADHERING LINER DEVICE FOR STRUCTURE PROTECTION AGAINST NATURAL DISASTERS AND METHOD OF USING THE SAME

(76) Inventor: Gilles Lachapelle, 7338, rue Berri, Montréal, QBC (CA), H2R 2G5

( * ) Notice: Subject to any disclaimer, the term of this patent is extended or adjusted under 35 U.S.C. 154(b) by 0 days.

(21) Appl. No.: 09/702,609

(22) Filed: Nov. 1, 2000

(51) Int. Cl.⁷ .............................................. E02D 19/00
(52) U.S. Cl. ...................... 52/169.14; 52/408; 52/409; 52/741.3; 52/741.4; 52/23
(58) Field of Search ........................... 52/168, 169.14, 52/408, 409, 410, 741.3, 741.4, 746.1, 23, DIG. 12; 405/107, 115, 116

(56) References Cited

U.S. PATENT DOCUMENTS

| | | | |
|---|---|---|---|
| 3,715,843 A | * | 2/1973 | Ballinger ............ 52/DIG. 12 X |
| 4,019,304 A | * | 4/1977 | Timm .......................... 52/746.1 |
| 4,315,535 A | | 2/1982 | Battle |
| 4,321,774 A | * | 3/1982 | Fish ............................... 52/63 |
| 4,458,456 A | | 7/1984 | Battle |
| 4,488,386 A | * | 12/1984 | Thompson .................. 52/169.1 |
| 4,693,042 A | * | 9/1987 | Villarreal .................. 52/169.14 |
| 5,040,919 A | | 8/1991 | Hendrix |
| 5,079,088 A | * | 1/1992 | McGroarty et al. .. 52/169.14 X |
| 5,190,089 A | | 3/1993 | Jackson |
| 5,865,564 A | | 2/1999 | Miller et al. |
| 6,029,405 A | * | 2/2000 | Wood .......................... 52/2.23 |
| 6,122,887 A | * | 9/2000 | Massette et al. ........... 52/741.4 |
| 6,122,889 A | * | 9/2000 | Zeidler .................... 52/746.11 |
| 6,224,700 B1 | * | 5/2001 | Oakley .................. 52/169.5 X |

* cited by examiner

Primary Examiner—Carl D. Friedman
Assistant Examiner—Brian E. Glessner

(57) ABSTRACT

A water-impermeable and adhering elongated liner protection device for temporarily externally protecting a structure such as a house building or an appliance item or the like against natural disasters such as flood, wind and the like. The liner substantially covers the perimeter of the structure from the ground surface surrounding the structure up to the base, the external side walls, including discontinuities such as corners, doors and window openings, and the roof of the structure. Generally heavy weights such as sand bags are distributed over the liner lapping over the ground surface to provide a hermetic protection between the surface and the liner. The preferably sticky and stretchable liner forms successive layers that wrap around the structure and adhere to the latter while sealably overlapping other the adjacent layer. The present invention also relates to the method of using such protection device.

18 Claims, 3 Drawing Sheets

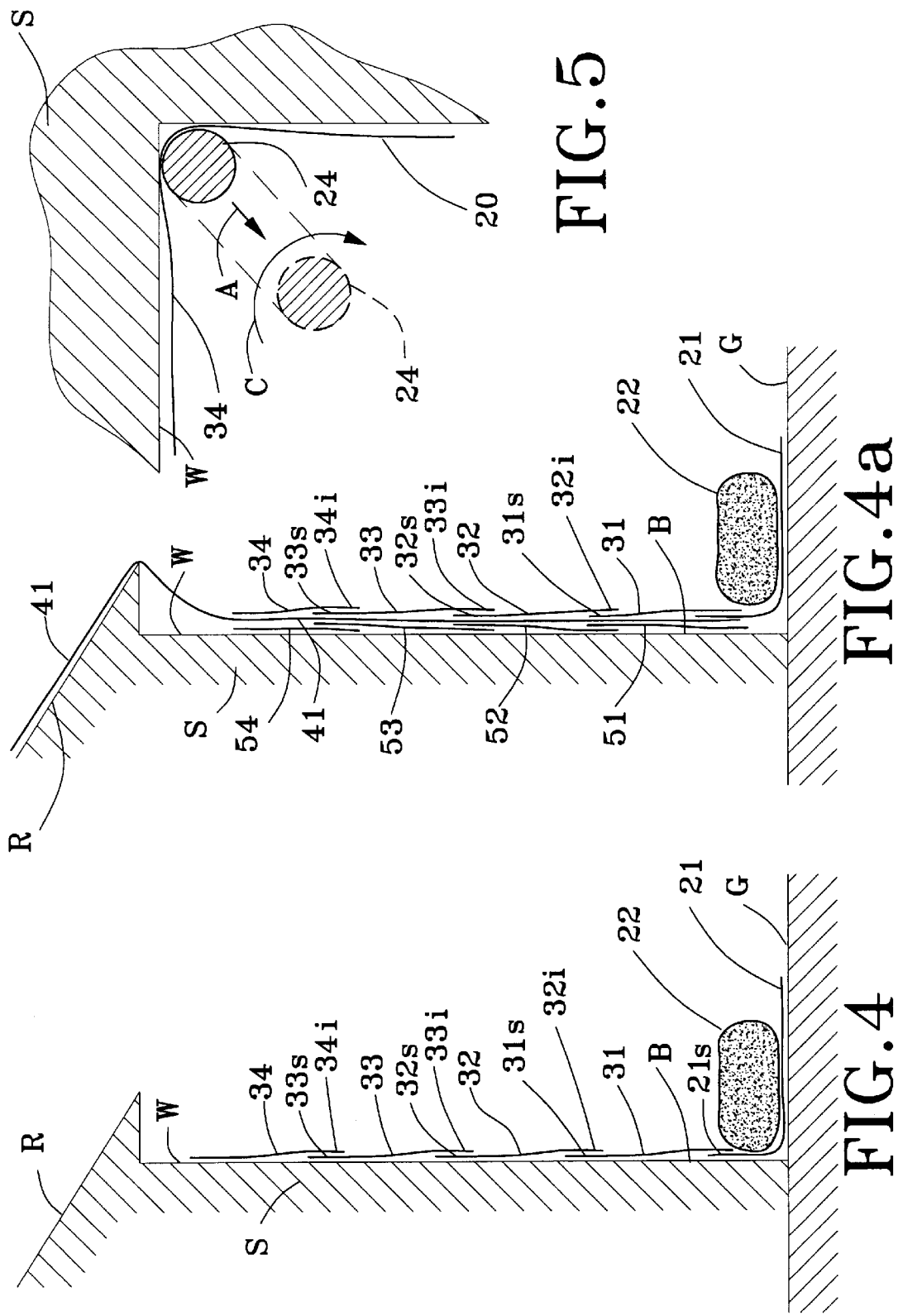

WATER IMPERMEABLE ADHERING LINER DEVICE FOR STRUCTURE PROTECTION AGAINST NATURAL DISASTERS AND METHOD OF USING THE SAME

FIELD OF THE INVENTION

The present invention relates to a protection device for protecting a structure from natural disasters such as floods, winds and the like, and to the method of using the same.

BACKGROUND OF THE INVENTION

In many parts of the world, housing and structures are prone to water damage such as in the event of flooding or any other natural disasters. The foundation of houses is often built with concrete that will after a few months or years have, imperceptible or not, cracks. As it will be understood by anyone skilled in the art, this is just one of the ways from which flooding waters can infiltrate and seriously damage houses and parts of their content.

Housing basement will also often have appliances such as washing or drying machines. These are just examples of items that could be alternatively and desirably protected against water damage that could be caused at unpredictable times by broken pipes or other events of misfortune. Obviously, all those damages to either houses or appliances could results in costly repairs, if indeed the house or the appliance can be fixed.

It is already known to protect structures such as appliances or houses. U.S. Pat. No. 4,315,535 issued on Feb. 16, 1982 to Battle and entitled "Flood Protection Container for Vehicles" protects vehicles by placing them in a flexible container. This invention carries the strong disadvantage of preventing the use of the protected vehicle, or any other item, while it is being protected.

Another prior art is U.S. Pat. No. 5,190,089 issued on Mar. 2, 1993 to Jackson and entitled "Protective Collapsible Bag Assembly for Appliance Items". This invention could not be installed on large structure such as houses. Finally, prior art described in U.S. Pat. No. 4,458,456 issued on Jul. 10, 1984 to Battle and entitled "Apparatus and Method for Protecting Structures from Flooding Waters" is certainly expensive to put together, and does not give protection at all times, i.e. it must be firstly installed, and then raised for protection when flooding is about to occur. In the event of the owner being away from home when protection is needed, this expensive system would become obsolete, thus money spent on an apparatus to protect the house would be lost, and damage would furthermore still be caused to the house and parts of its content.

OBJECTS OF THE INVENTION

It is therefore a general object of the present invention to provide a liner device for a temporary protection of a structure against natural disasters of the character described which obviates the above noted disadvantages.

An advantage of the present invention is that the proposed liner device for protection against natural disasters is water-impermeable, stretchable and adhering as to appropriately protect the structure or appliance it is covering.

A further advantage of the present invention is that the proposed liner device for protection against natural disasters can be installed alternatively on appliances, houses or other structures of various sizes.

Another advantage of the present invention is that the proposed liner device for protection against natural disasters does not necessarily prevent usage of the structure while being protected.

A further advantage of the present invention is that the proposed liner device for protection against natural disasters is not expensive and that can be easily installed.

Another object of the present invention is to provide a method for protecting a structure from natural disasters using a water impermeable liner device.

SUMMARY OF THE INVENTION

According to one aspect of the present invention, there is provided a protection device for temporarily externally protecting a structure against natural disaster, the structure defining a base and external side walls, the base protruding out from a ground surface surrounding the structure, the external side walls defining a bottommost part thereof adjacent the base and generally extending upwardly therefrom, two adjacent of the external side walls of the structure defining wall-to-wall intersections therebetween, the structure including a plurality of heavy weights adjacent the ground surface, the device comprises:

a water impermeable and structure adhering elongated liner for continuously covering and wrapping over the base and the external side walls of the structure, the liner forming a generally elongated bottom layer, the bottom layer defining a bottom layer inferior section and a generally opposed bottom layer superior section extending integrally therefrom, the bottom layer superior section being configured and sized for lapping over the base and the bottommost part of the external side walls and wall-to-wall intersections, the bottom layer inferior section being configured and sized for folding over the ground surface so as to receive the plurality of heavy weights thereon;

the heavy weights being substantially uniformly distributed along the bottom layer inferior section for applying pressure thereon against the ground surface and providing a generally waterproof seal between the bottom layer and the ground surface.

Preferably, the liner further forms generally elongated adjacent wall layers, each of the wall layers defining a wall layer inferior section and a generally opposed wall layer superior section extending integrally therefrom, the wall layer inferior section of one of the wall layers overlapping the wall layer superior section of a previous adjacent one of the wall layers so as to successively upwardly extend protection of the structure, the wall layer inferior section of a lowermost of the wall layers overlapping the bottom layer superior section, the wall layers for continuously wrapping around the external side walls and the wall-to-wall intersections of the structure.

Typically, the liner further forms generally elongated adjacent wall layers, each of the wall layers defining a wall layer inferior section and a generally opposed wall layer superior section extending integrally therefrom, the wall layer superior section of one of the wall layers overlapping the wall layer inferior section of a previous adjacent one of the wall layers so as to successively downwardly extending protection of the structure, the wall layer inferior section of a lowermost of the wall layers overlapping the bottom layer superior section, the wall layers for continuously wrapping around the external side walls and the wall-to-wall intersections of the structure.

Typically, at least one of the wall-to-wall intersections is an internal corner, the device further comprises a retainer member for running along the internal corner for being secured thereto, the retainer member forcing the wall layers of the liner to assume the internal corner and remain in place, whereby the wall layers run between the internal corner and the retainer member.

Preferably, the retainer member is an elongated elasticized member.

Typically, the heavy weights are bags filled with generally small and dense material, preferably sand.

Preferably, the structure further defines a roof extending from the external side walls, the roof and the external side walls defining roof-to-side wall intersections, the liner further forms generally elongated adjacent roof layers, each of the roof layers defining a first longitudinal end and a generally opposed second longitudinal end, each of the roof layers substantially runs from the wall layers covering a first one of the external side walls of the structure up to the roof and back down to the wall layers covering a second one of the external side walls generally opposed to the first one, the first and second longitudinal ends sealably attaching to the corresponding wall layers, the roof layers for running adjacent the roof-to-side wall intersections so as to minimize air volume therebetween.

Preferably, the structure further defines a surrounding ground opening cover, the liner further forms generally elongated adjacent opening layers for covering the ground opening cover, each of the opening layers overlapping each successive adjacent one of the opening layers so as to receive the heavy weights thereon, the heavy weights being substantially uniformly distributed along the opening layers for applying pressure thereon against the ground opening cover and providing a generally waterproof seal between the opening layers and the ground opening cover.

Preferably, the liner is stretchable for achieving better waterproofness between adjacent of the bottom and wall layers.

According to another aspect of the present invention, there is provided a method temporarily externally protecting a structure against natural disaster, the structure defining a base and external side walls, the base protruding out from a ground surface surrounding the structure, the external side walls defining a bottommost part thereof adjacent the base and generally extending upwardly therefrom, two adjacent of the external side walls of the structure defining wall-to-wall intersections therebetween, the structure including a plurality of heavy weights adjacent the ground surface, the method comprises the steps of:

a) providing a water impermeable and structure adhering elongated liner for continuously covering and wrapping over the base and the external side walls of the structure, the liner forming a generally elongated bottom layer, the bottom layer defining a bottom layer inferior section and a generally opposed bottom layer superior section extending integrally therefrom;

b) installing the bottom layer superior section over the base and the bottommost part of the external side walls and wall-to-wall intersections and the bottom layer inferior section over the ground surface; and c) installing the plurality of heavy weights over the bottom layer inferior section, the heavy weights being substantially uniformly distributed along the bottom layer inferior section for applying pressure thereon against the ground surface and providing a generally waterproof seal between the bottom layer and the ground surface.

Preferably, the method further comprises the following step of:

d) installing generally elongated adjacent wall layers formed by the liner, each of the wall layers defining a wall layer inferior section and a generally opposed wall layer superior section extending integrally therefrom, the wall layer inferior section of one of the wall layers overlapping the wall layer superior section of a previous adjacent one of the wall layers so as to successively upwardly extend protection of the structure, the wall layer inferior section of a lowermost of the wall layers overlapping the bottom layer superior section, the wall layers for continuously wrapping around the external side walls and the wall-to-wall intersections of the structure.

Preferably, at least one of the wall-to-wall intersections is an internal corner, the method further comprises the following step of:

e) providing a retainer member for running along the internal corner for being secured thereto, the retainer member forcing the wall layers of the liner to assume the internal corner and remain in place, whereby the wall layers run between the internal corner and the retainer member.

Preferably, the structure further defines a roof extending from the external side walls, the roof and the external side walls defining roof-to-side wall intersections, the method further comprising the following step of:

f) installing generally elongated adjacent roof layers formed by the liner, each of the roof layers defining a first longitudinal end and a generally opposed second longitudinal end, each of the roof layers substantially runs from the wall layers covering a first one of the external side walls of the structure up to the roof and back down to the wall layers covering a second one of the external side walls generally opposed to the first one, the first and second longitudinal ends sealably attaching to the corresponding wall layers, the roof layers for running adjacent the roof-to-side wall intersections so as to minimize air volume therebetween.

Preferably, the wall layers forms a first series of wall layers, the method further comprises the following step of:

g) repeat step d) to install a second series of wall layers over the first and second longitudinal ends of the roof layers so as to ensure attachment thereof between the first and second series of wall layers.

BRIEF DESCRIPTION OF THE DRAWINGS

In the annexed drawings, like reference characters indicate like elements throughout.

FIGS. 4 and 4a are section views taken along lines 4—4 and 4a—4a of FIG. 3 respectively; and FIG. 5 is a section view taken along line 5—5 of FIG. 3.

DETAILED DESCRIPTION OF THE PREFERRED EMBODIMENT

Figure 1:
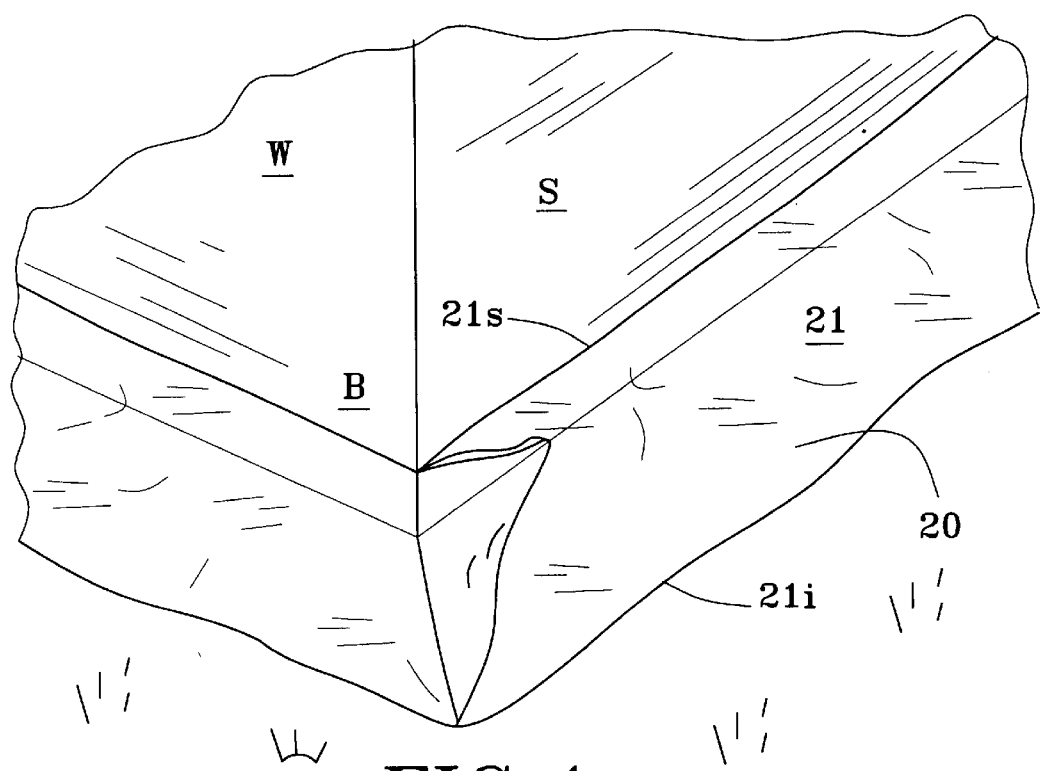
FIG. 1 is a perspective view of an embodiment of the present invention showing a first bottom layer of a liner covering the lower section of a partially broken structure.
Figure 2:
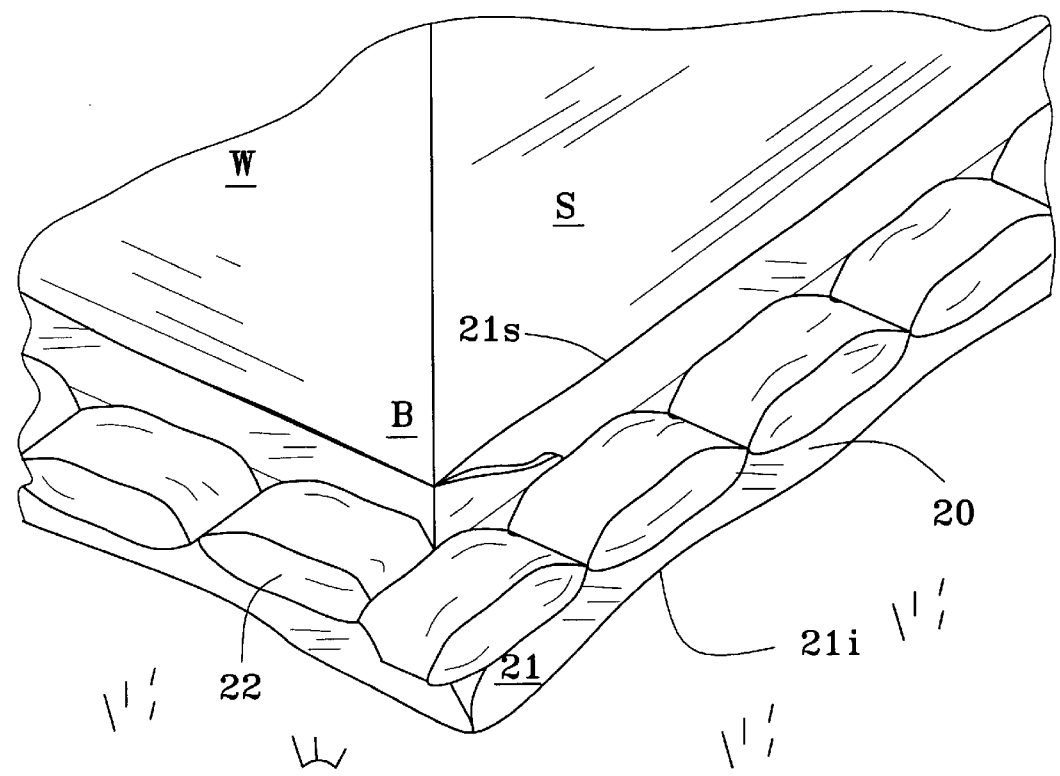
FIG. 2 is a perspective view of an embodiment of FIG. 1 showing heavy-filled bags being laid down on lower section of the ground covering layer.

Referring to FIGS. 1 and 2 there is partially shown a structure S, such as a house or the like, and more specifically, part of its base B. As shown on FIG. 1, an embodiment of a protection device 20 according to the present invention, preferably a water-impermeable elongated liner 20, is covering the base B of the structure S along its full perimeter (not completely shown). The preferably transparent liner 20 is sticky as to preferably releasably adhere to the exterior material used in standard housing constructions, and to itself when having sections overlapping each other. Preferably, the liner 20 is provided as rolls to ease its application on the structure S. Liner 20 is preferably a high strength linear material such as low density polyethylene film with a width preferably varying from 15 to 75 inches (380 to 1910 mm) and a thickness preferably varying from 0.00125 to 0.00325 inch (31.25 to 81.25 µm).

An inferior section of a first bottom layer 21i (the indicia "i" refers to the inferior section of the corresponding layer) of the liner 20 covering the base B of the structure S is folded over the ground surface G surrounding the structure S, example of ground surface G being grass. Since most ground surfaces are not totally leveled, heavy flexible weights 22, preferably bags filled with small and dense material (not shown) such as sand are laid down on the liner 20 all around the perimeter at the base B of the structure S, as shown on FIG. 2. Those bags 22 shall be heavy enough, and the material contained therein small enough as to assume the non-uniform and corrugated ground surface G and provide an hermetic protection, i.e. water could not filter through under the inferior section of the bottom layer 21i of the liner 20 since the heavy bags 22 will provide at minimum a strong pressure of a continuing hermetic line under and between the same and the ground surface G. Ultimately, a second layer of bags 22 could cover the inferior edge of the bottom layer 21 for better hermetic seal. Accordingly, any small plants of the landscaping shall obviously preferably be at a certain distance from the external side walls W of the structure S to improve the protection efficiency of the layer 21 of the liner 20. Obviously, since the hermetic line between the inferior section of the first bottom layer 21i and the ground surface G created by the bags 22 will be sufficient for a reasonable amount of time, such as a few days. After that period, some dripping or water infiltration could occur since the hermetic line is not perfect.

Figure 3:
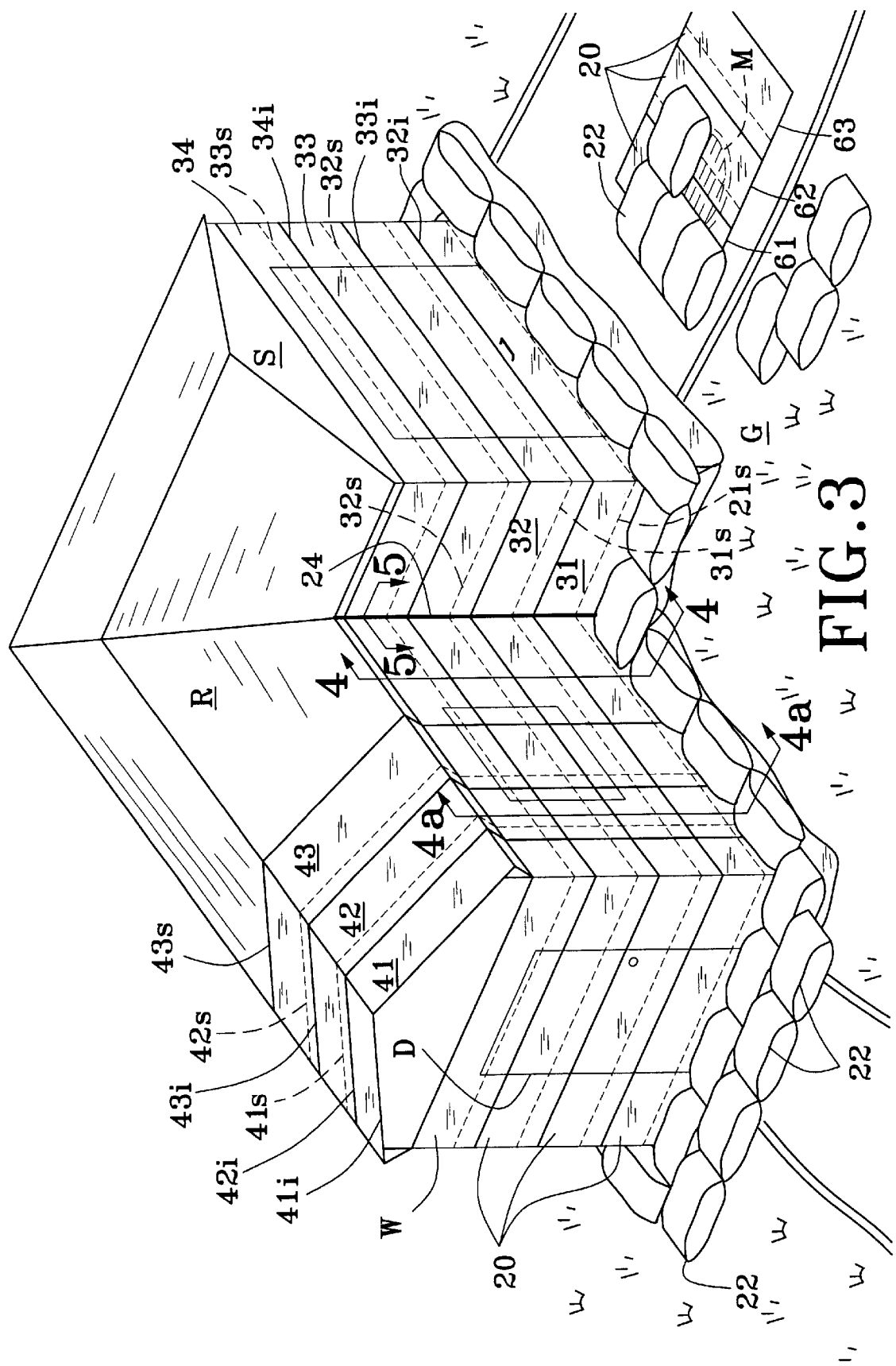
FIG. 3 is a perspective view of the invention showing multiple layers of the liner on a structure.

To provide further protection, especially in height and as shown on FIG. 3, a plurality of additional wall layers 31, 32, 33, etc. provided, preferably in continuity, by the same liner 20 can be wrapped around the structure S to cover the external side walls W and the wall-to-wall intersections, or corners, thereof. This is realized by having an inferior section of an adjacent upper second wall layer 32i lapping over a superior section of the adjacent lower first wall layer 31s (the indicia "s" refers to the superior section of the corresponding layer). Preferably, the adjacent layers 31, 32 are of a same continuous initial liner 20. Similarly, a further inferior section of a third wall layer 33i laps over a superior section of the second wall layer 32s, the same lapping pattern applies to any additional wall layers. Obviously, the inferior section of the first wall layer 31i laps over the superior section of the bottom layer 21s, so as to form a structure protection with an upper layer always overlapping the edge of the adjacent lower layer to improve protection from possible heavy rain falls, as shown in FIG. 4 where the different layers are shown in a detached position from each other for clarity of illustration purposes only. Ultimately, the inferior and superior sections of each layer preferably refer from the lower and upper tenths to halves, preferably quarters, of the total width of the layer respectively. Since the liner 20 is sticky (adhering) in itself, preferably only on one side, the structure side, and water-impermeable, a superposition of its adjacent layers 31, 32, 33, etc. ensures waterproofness therebetween. The structure S can therefore be fully protected up to a certain height, at all times, against flooding or other similar natural disaster by means of covering appropriately the structure S with the liner 20. Obviously, the water (or wind) pressure on the liner 20 will improve its adherence to the structure S and its protection efficiency.

To further protect the structure S, a plurality of adjacent roof layers 41, 42, 43, etc. can cover the roof R of the structure. Similarly to the wall layers 32, 32. 33, etc., the roof layers successively overlap each adjacent ones, as partially shown in FIG. 3. Preferably, each roof layer 41, 42, 43, etc. has a first longitudinal end and a second longitudinal end being preferably overlapped by wall layers 31, 32, 33, etc. on generally opposite external side walls of the structure S, as shown on FIG. 4a where again the different layers are shown in a detached position from each other for clarity of illustration purposes only. Therefore, the roof layers 41, 42, etc. are preferably installed prior to the wall layers 31, 32, etc. and are tightened so as to minimize the amount of air volume enclosed at the roof-to-wall intersection, or commonly called soffit, area of the structure S. As shown in FIG. 4a, a first, or inner, series of wall layers 51, 52, 53, etc. could be installed first onto the walls W of the structure S to improve the adherence and the installation of the roof layers 41, 42, 43, etc. onto the latter prior to applying the bottom 21 and second, or outer, series of wall layers 31, 32, 33, etc. Optionally, the inner series of wall layers 51, 52, 53, etc. could alternatively be a second outer series (not shown) when the roof layers 41, 42, 43, etc. overlap the first inner series of wall layers 31, 32, 33, etc. without departing for the scope of the present invention. Obviously, the larger the quantity of series of wall and roof layers of liner 20 installed on the structure S, the better the protection will be.

As shown in FIG. 5, a retainer member, preferably an elongated elasticized member 24 such as rubber made material, is preferably tightly running along each internal corner of adjacent external side walls W of the structure S and secured to the latter at its extremities. The elasticized member 24 is used to force all wall layers 31, 32, 33, etc. of the liner 20 running at the internal corner to better assume the same and remain in place. During installation of a wall layer 32, the elasticized member 24 is temporarily stretched away from the corner along arrow A, as shown in dotted lines, to allow for the layer to run behind, along arrow C, after which the member 24 is released back in its original position, maintaining the layer 32 against the internal corner.

As required, extension or opening adjacent and overlapping layers 61, 62, 63, etc. of liner 20 can be used to cover local manhole covers M or other ground opening covers of water network surrounding the structure S with the help of weights 22 to apply pressure thereon, as shown in FIG. 3.

Obviously, in case of damages occurring to the liner 20 during installation of the same, some patches (not shown) could be used to repair these damages, since the liner 20 easily adheres to itself and to under layers.

Preferably, the liner 20 is made out of a stretchable material such as low density polyethylene film or the like to ease its installation and overlapping of small discontinuities such as door handles and frames, windows frames and the like located all around the structure S.

The present invention also provides the method protecting the structure S prior to having a forecasted natural disaster striking over.

As an example, the method essentially comprises the first step of properly installing the liner 20 to form the bottom layer 21 which has an inferior section 21i being folded over the ground surface G surrounding the structure S and a superior section 21s lapping over the base B and a bottommost part of the external side walls W and wall-to-wall intersections (corners). After, a plurality of flexible heavy weights 22 are adjacently and continuously laid down over the inferior section of the bottom layer 21i of the liner 20 all around the structure S in order to apply enough pressure to provide an hermetic protection between the ground surface G surrounding the structure S and the inferior section of the bottom layer 21i of the liner 20. Then, the liner 20 is properly installed to form a plurality of adjacent wall layers 31, 32, 33, etc. overlapping each adjacent one and successively upwardly extending protection of the structure S by having a superior section of one of the wall layers 31, 32, 33, etc. being lapped over by an inferior section of an upward adjacent wall layer, the latter continuously wrapping around the external side walls W and corners of the structure S.

Preferably, a retainer member 24 is installed to run along an internal corner formed by two adjacent of the side walls and is secured thereto. The retainer member 24 is adapted to force the wall layers 31, 32, 33, etc. of the liner 20 to assume the internal corner and remain in place.

Optionally, a plurality of adjacent roof layers 41, 42, 43, etc. are properly installed for each to run from a first longitudinal end sealably secured to an external side wall W of the structure S up to the roof R and back down to a second longitudinal end sealably secured to a generally opposite external side wall W of the structure S. Both first and second longitudinal ends tightly assume roof-to-side wall intersection to minimize the air volume entrapped therein. Then, an additional series of wall layers is installed over the first series and the first and second longitudinal ends of the roof layers 41, 42, 43, etc. to secure the latter.

Although an embodiment has been described herein with some particularity and details, many modifications and variations of the preferred embodiment are possible without deviating from the scope of the present invention.

I claim:

1. A protection device for temporarily externally protecting a structure against natural disaster, said structure defining a base and external side walls, said base protruding out from a ground surface surrounding said structure, said external side walls defining a bottommost part thereof adjacent said base and generally extending upwardly therefrom, two adjacent of said external side walls of said structure defining wall-to-wall intersections therebetween, said structure including a plurality of heavy weights adjacent said ground surface, said device comprising:

a water impermeable and structure adhering elongated liner for continuously covering and wrapping over said base and said external side walls of said structure, said liner forming a generally elongated bottom layer, said bottom layer defining a bottom layer inferior section and a generally opposed bottom layer superior section extending integrally therefrom, said bottom layer superior section being configured and sized for lapping over said base and said bottommost part of said external side walls and wall-to-wall intersections, said bottom layer inferior section being configured and sized for folding over said ground surface so as to receive said plurality of heavy weights thereon;

said heavy weights being substantially uniformly distributed along said bottom layer inferior section for applying pressure thereon against said ground surface and providing a generally waterproof seal between said bottom layer and said ground surface.

2. A protection device as defined in claim 1, wherein said liner further forms generally elongated adjacent wall layers, each of said wall layers defining a wall layer inferior section and a generally opposed wall layer superior section extending integrally therefrom, said wall layer inferior section of one of said wall layers overlapping said wall layer superior section of a previous adjacent one of said wall layers so as to successively upwardly extend protection of said structure, said wall layer inferior section of a lowermost of said wall layers overlapping said bottom layer superior section, said wall layers for continuously wrapping around said external side walls and said wall-to-wall intersections of said structure.

3. A protection device as defined in claim 1, wherein said liner further forms generally elongated adjacent wall layers, each of said wall layers defining a wall layer inferior section and a generally opposed wall layer superior section extending integrally therefrom, said wall layer superior section of one of said wall layers overlapping said wall layer inferior section of a previous adjacent one of said wall layers so as to successively downwardly extending protection of said structure, said wall layer inferior section of a lowermost of said wall layers overlapping said bottom layer superior section, said wall layers for continuously wrapping around said external side walls and said wall-to-wall intersections of said structure.

4. A protection device as defined in claim 2, wherein at least one of said wall-to-wall intersections is an internal corner, said device further comprises a retainer member for running along said internal corner for being secured thereto, said retainer member forcing said wall layers of said liner to assume said internal corner and remain in place, whereby said wall layers run between said internal corner and said retainer member.

5. A protection device as defined in claim 4, wherein said retainer member is an elongated elasticized member.

6. A protection device as defined in claim 3, wherein at least one of said wall-to-wall intersections is an internal corner, said device further comprises a retainer member for running along said internal corner for being secured thereto, said retainer member forcing said wall layers of said liner to assume said internal corner and remain in place, whereby said wall layers run between said internal corner and said retainer member.

7. A protection device as defined in claim 6, wherein said retainer member is an elongated elasticized member.

8. A protection device as defined in claim 4, wherein said heavy weights are bags filled with generally small and dense material.

9. A protection device as defined in claim 8, wherein said material consists of sand.

10. A protection device as defined in claim 2, wherein said structure further defines a roof extending from said external side walls, said roof and said external side walls defining roof-to-side wall intersections, said liner further forms generally elongated adjacent roof layers, each of said roof layers defining a first longitudinal end and a generally opposed second longitudinal end, each of said roof layers substantially runs from said wall layers covering a first one of said external side walls of said structure up to said roof and back down to said wall layers covering a second one of said external side walls generally opposed to the first one, said first and second longitudinal ends sealably attaching to said corresponding wall layers, said roof layers for running adjacent said roof-to-side wall intersections so as to minimize air volume therebetween.

11. A protection device as defined in claim 2, wherein said structure further defines a surrounding ground opening cover, said liner further forms generally elongated adjacent opening layers for covering said ground opening cover, each of said opening layers overlapping each successive adjacent one of said opening layers so as to receive said heavy weights thereon, said heavy weights being substantially uniformly distributed along said opening layers for applying pressure thereon against said ground opening cover and providing a generally waterproof seal between said opening layers and said ground opening cover.

12. A protection device as defined in claim 2, wherein said liner is stretchable for achieving better waterproofness between adjacent of said bottom and wall layers.

13. A method for temporarily externally protecting a structure against natural disaster, said structure defining a base and external side walls, said base protruding out from a ground surface surrounding said structure, said external side walls defining a bottommost part thereof adjacent said base and generally extending upwardly therefrom, two adjacent of said external side walls of said structure defining wall-to-wall intersections therebetween, said structure including a plurality of heavy weights adjacent said ground surface, said method comprising the steps of:

a) providing a water impermeable and structure adhering elongated liner for continuously covering and wrapping over said base and said external side walls of said structure, said liner forming a generally elongated bottom layer, said bottom layer defining a bottom layer inferior section and a generally opposed bottom layer superior section extending integrally therefrom;

b) installing said bottom layer superior section over said base and said bottommost part of said external side walls and wall-to-wall intersections and said bottom layer inferior section over said ground surface; and c) installing said plurality of heavy weights over said bottom layer inferior section, said heavy weights being substantially uniformly distributed along said bottom layer inferior section for applying pressure thereon against said ground surface and providing a generally waterproof seal between said bottom layer and said ground surface.

14. A method as defined in claim 13, further comprising the following step of:

d) installing generally elongated adjacent wall layers formed by said liner, each of said wall layers defining a wall layer inferior section and a generally opposed wall layer superior section extending integrally therefrom, said wall layer inferior section of one of said wall layers overlapping said wall layer superior section of a previous adjacent one of said wall layers so as to successively upwardly extend protection of said structure, said wall layer inferior section of a lowermost of said wall layers overlapping said bottom layer superior section, said wall layers for continuously wrapping around said external side walls and said wall-to-wall intersections of said structure.

15. A method as defined in claim 14, wherein at least one of said wall-to-wall intersections is an internal corner, said method further comprising the following step of:

e) providing a retainer member for running along said internal corner for being secured thereto, said retainer member forcing said wall layers of said liner to assume said internal corner and remain in place, whereby said wall layers run between said internal corner and said retainer member.

16. A method as defined in claim 15, wherein said structure further defines a roof extending from said external side walls, said roof and said external side walls defining roof-to-side wall intersections, said method further comprising the following step of:

f) installing generally elongated adjacent roof layers formed by said liner, each of said roof layers defining a first longitudinal end and a generally opposed second longitudinal end, each of said roof layers substantially runs from said wall layers covering a first one of said external side walls of said structure up to said roof and back down to said wall layers covering a second one of said external side walls generally opposed to the first one, said first and second longitudinal ends sealably attaching to said corresponding wall layers, said roof layers for running adjacent said roof-to-side wall intersections so as to minimize air volume therebetween.

17. A method as defined in claim 16, wherein said wall layers form a first series of wall layers, said method further comprising the following step of:

g) repeat step d) to install a second series of wall layers over said first and second longitudinal ends of said roof layers so as to ensure attachment thereof between said first and second series of wall layers.

18. A method as defined in claim 15, wherein said retainer member is an elongated elasticized member.

* * * * *